United States Patent [19]

Pastor et al.

[11] Patent Number: 4,878,246

[45] Date of Patent: Oct. 31, 1989

[54] METHOD AND APPARATUS FOR GENERATING ENCRYPTION/DECRYPTION KEY

[75] Inventors: Jose Pastor, Westport; Maya R. Barton, Ridgefield, both of Conn.

[73] Assignee: Pitney Bowes Inc., Stamford, Conn.

[21] Appl. No.: 188,866

[22] Filed: May 2, 1988

[51] Int. Cl.$^4$ .............................................. H04L 9/04
[52] U.S. Cl. ........................................ 380/44; 380/50
[58] Field of Search .............................. 380/44, 47, 50

[56] References Cited

U.S. PATENT DOCUMENTS

| | | | |
|---|---|---|---|
| 4,274,085 | 6/1981 | Marino, Jr. | 380/44 |
| 4,358,852 | 11/1982 | Ichikawa et al. | 380/50 |
| 4,447,672 | 5/1984 | Nakamura | 380/50 |
| 4,613,901 | 9/1986 | Gilhousen et al. | 380/47 |
| 4,771,462 | 9/1988 | Hannan et al. | 380/50 |
| 4,780,905 | 10/1988 | Cruts et al. | 380/44 |
| 4,803,725 | 2/1989 | Horne et al. | 380/47 |

Primary Examiner—Salvatore Cangialosi
Attorney, Agent, or Firm—Robert H. Whisker; Melvin J. Scolnick; David E. Pitchenik

[57] ABSTRACT

An encryption/decryption key is generated from an identification number ID by first generating two sets of numbers from the identification number ID, based upon known expressions. The first set of numbers are employed as coefficients of a first polynomial to generate N first numbers for x=0, 1 ... N−1 (N is the number of bits of the key) and a second number corresponding to each first number is generating employing the second set of numbers as coefficients and the generated first numbers as variables. The ordered pairs of first and second numbers generated correspond to addresses of a memory at which bits of the key are stored, the order of the bits being determined by the corresponding values of X. The expressions employ modular arithmetic using prime numbers as bases.

19 Claims, 2 Drawing Sheets

METHOD AND APPARATUS FOR GENERATING ENCRYPTION/DECRYPTION KEY

This invention relates to a method and apparatus for generating an encryption/decryption key and is more, in particular, directed to the generation of such a key based upon an identification number, wherein the possibility that the key may be generated by unauthorized personnel unaware of the identification number is substantially reduced.

The method and apparatus in accordance with the invention are particularly applicable to the synchronous generation of the key at a plurality of different stations, for example, at the data center and server of a postal system, as will be described, but it is apparent that the invention is equally applicable to the generation of keys for other applications.

In one type of encryption/decryption system, a key for encryption/decryption, for example, for DES encryption, is stored in a non-volatile memory. Since conventionally programmed non-voltalie memory can be read out, it is accessible to unauthorized personnel, the security of such a system is dependent upon the provision of adequate physical security such that unauthorized personnel cannot gain access to the memory. This solution is, of course, not always possible or feasible.

For example, in a postal system enabling the mailing of batch mail, a server, i.e., is provided with an encoding device for generating a "manifest" listing all pertinent data relating to the mailing of a batch of mail. This manifest is received by the Post Office along with the mail of the corresponding batch. In order that the Post Office can verify that the manifest truly represents that batch of mail, and properly identifies the amount of postage required for the batch, the server imprints a verification encryption on the manifest, the verification encryption employing a key that is a function, for example, of the date, the identification of the server and the transaction number of the batch, in order to reduce the danger of unauthorized decryption of the encryption number printed on the manifest. Such unauthorized decryption could permit, for example, tampering with the data printed on the manifest, so that it does not truly represent the amount of postage that may be due. In such systems, it may not be feasible to provide absolute security for the encryption/decryption key stored at the location of the server.

The present invention is directed to the provision of a method and apparatus for substantially reducing the danger of the determination of a key stored in a memory.

In accordance with the invention, the bits or bytes of a key for encryption/decryption are stored at locations distributed in a determined manner in a non-volatile memory, the remaining locations of the memory having data randomly stored therein that is not related to the key. As a result, the key can be retrieved only upon knowledge of the locations at which the bits or bytes corresponding to the key are stored.

For example, if 64 bits of a key are to be randomly located on a 2K memory, e.g., about 16,000 bits, and the remainder of locations of the memory are randomly written with 1's and 0's, it is apparent that approximately 16000!/15936!, or approximately $10^{260}$ combinations of 64 bits are possible, and that retrieval of such a key is substantially impossible.

The invention further includes a method and apparatus for describing the locations at which the bits of the key are located, so that location of the key is substantially impossible unless all of the required algorithms, as well as a secret identification number, are available.

In accordance with one feature of the invention, a method is provided for generating a key code from an identification number ID, the key having N bits. The method includes the steps of generating a first set of numbers, modulus A and a second set of numbers, modulus B, from the ID, in accordance with a set of algorithms, wherein A and B are prime numbers. The N values $y(x)$, mod A, are generated from a first polynomial having the first set of numbers as coefficients and x as a variable, wherein x is an integer from 0 to $N-1$ and values $z(y)$, mod B, are generated from a second polynomial having the second set of numbers as coefficients and y as a variable, corresponding to each value of $y(x)$. A memory is accessed at addresses determined as a function of y,z corresponding to each value of x to retrieve data therein, and the data retrieved is reordered as a function of the value of x to produce the key.

In the preferred embodiment of an apparatus in accordance with the invention, a device is provided for generating a key code from an identification number ID, the key having N bits. The device coprises means for generating a first plurality of numbers, modulus A and a second plurality of numbers, modulus B, from ID, in accordance with a set of algorithms, wherein A and B are prime numbers. In addition, means are provided for generating N values $y(x)$, mod A, from a first polynomial having the first plurality of numbers as coefficients and x as a variable, wherein x is an integer from 1 to N. Means are provided for generating a value $z(y)$, mod B, from a second polynomial having the second plurality of numbers as coefficients and y as as variable, corresponding to each value of $y(x)$. The device also includes means for accessing a memory at addresses corresponding to each value of x to retrieve data therein, and for reordering the data as a function of the value of x to produce the key.

In the above example, of a 64 bit key, to be stored in a $64 \times 250$ matrix memory, it is apparent that even if unauthorized personnel were able to determine that algorithms employed to determine the coefficients of the polynomials, and the polynomials themselves, the absence of knowledge of the identification number ID employed in the generation of these numbers, would still leave $250^3 \times 64^3$, approximately $10^{12}$ combinations of 64 bits that could possibly be the key. Thus, without knowledge of the identification number ID itself, determination of the key for encryption/decryption is not feasible, since, in this example, based upon the information in the manifest, and employing 800,000 multiplications per second, it would take approximately 20 or more days to find the key, depending upon the complexity of the algorithms.

In order to synchronously generate the key at more than one location, it is apparent that two such devices may be employed having the same expressions and tables stored therein, so that identical keys can be generated in response to the application of the same ID number thereto.

In order that the invention may be more clearly understood, it will now be disclosed with reference to the accompanying drawings, wherein.

The invention enables the storing of a code key in non-volatile memory, such as ROM or the like, in such a manner that it cannot be feasibly accessed unless an ID number is known.

Figure 1:
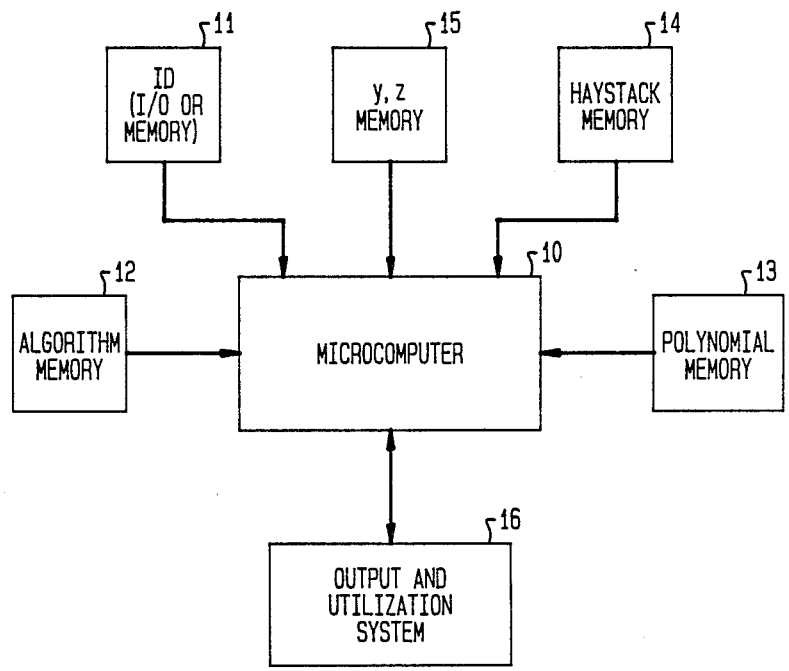
FIG. 1 is a simplified block diagram of a device for developing a code key, in accordance with the invention.

FIG. 1 illustrates one embodiment of a device which may be used, in accordance with the invention, for generating a code key from an identification number ID. Referring to this figure, the method and equipment in accordance with the invention employ a calculation circuit, such as microcomputer 10, as well as various preprogrammed memories of memory portions (which may comprise portions of the microcomputer) and an output and utilization system 16, which requests, receives and uses keys derived in accordance with the subject invention in a conventional manner and does not form part of the subject invention per se. The device thus incorporates:

1. A source 11 of a secret ID, known only to authorized personnel. This number may be stored in physically secure memory in the device itself, or input to the device.

2. A memory 12 storing algorithms to generate 6 numbers from the ID, $$P_i = g_i(ID) \bmod A \quad (1)$$

$$Q_j = g_j(ID) \bmod B \quad (2)$$

where $i=j=1, 2$ and 3, for example, and A and B are prime numbers. No substantial restrictions are placed on these algorithms, and they may be simple or complex. (Those skilled in the art will recognize that i need not equal j and that i and j may range up to $A-1$ and $B-1$ respectively. No further advantage is gained for larger values of i and j, since, for C prime, $w^{C-1} \bmod C = 1$, $w^C \bmod C = w \bmod C$, etc.)

3. An "y,z" memory 15 of A*B cells. All of the numbers from 1 to A*B are stored, at different locations, in this ROM. As illustrated in the flow diagram of FIG. 2, this memory is employed to generate the six numbers $P_1-P_3$ and $Q_1-Q_3$ from the ID and the algorithms (1) and (2).

4. A memory 13 for storing firmware algorithms for deriving $y=y(x)$ and $z=z(y)$. These algorithms are polynomials using $P_1-P_3$ and $Q_1-Q_3$ as coefficients, respectively. The algorithms operated on a finite field, $Z_s$, i.e., on clock-arithmetic, with S as a prime number. As an examle:

$$y = [P_1 + P_2 x^2 + P_3 x^3] \bmod A \quad (3)$$

$$z = [Q_1 y + Q_2 y^2 + Q_3 y^3] \bmod B \quad (4)$$

Figure 2:
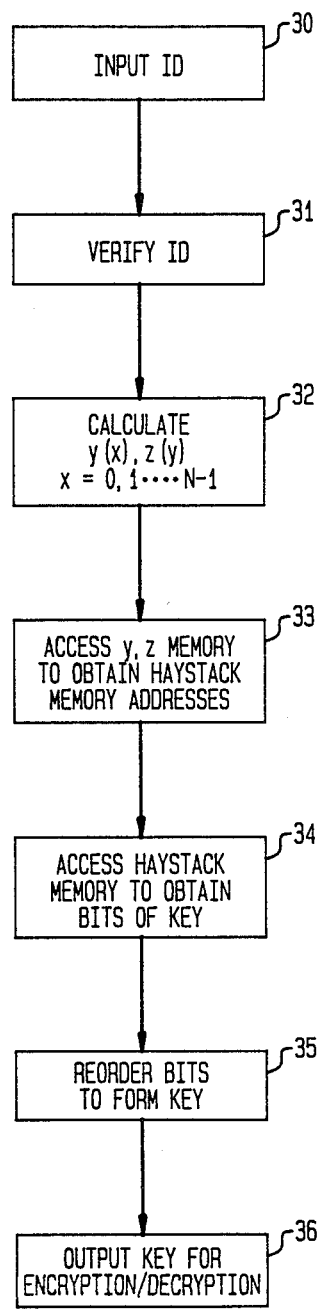
FIG. 2 is a simplified flow diagram illustrating the method of the invention.

Other polynomial expressions could be used that involve the six numbers $P_1-P_3$ and $Q_1-Q_3$. In these expressions, $x=0$ to $N-1$, wherein N is the number of bits of the key to be hidden in an "haystack" memory. As illustrated in FIG. 2, the polynomial expressions are employed along with the computed values of $P_i$ and $Q_i$, to generate a series of values $y_i(x)$ and $z_i(y)$.

5. A "haystack" 14 memory for storing the bits of the key at locations that will be identified by the method of the invention. The prime number A is preferably the smallest prime number greater than one less than the number of bits N of the key to be hidden. If the key is to be hidden in a memory having for examle M*N bits, B is preferably selected to be the highest prime number such that A*B bits will fit in the memory. The locations of the memory are identified sequentially by number from 1 to A*B.

As above discussed, the value of y is computed from these expressions for each value of x from 1 to $N-1$, and the corresponding value of z is then computed. The y and corresponding z values access the columns and rows of the y,z memory, to retrieve the number (from 1 to A*B) stored therein. These numbers are the address locations for accessing the haystack memory.

The y values also correspond to the bit position of the key, so that the 0's and 1's stored at the addressed locations of the haystack memory are reassembled in the order of the corresponding y values, to derive the N bit key. This reassembly of the bits is preferably effected after the bits have been recovered from the haystack memory, although it may be effected by reordering of the addresses before accessing the haystack memory.

Prime numbers must be used for A and B so that all of the numbers for 0 to $A-1$ and from 0 to $B-1$ can be generated with the polynomial expressions.

Locations of the haystack memory that do not include the key are randomly programmed with 0's and 1's.

As an example, assume that the code key has 12 bits. The prime number A is preferably selected to be 13, the smallest prime number greater than 11. Assume also that the prime number B is selected to be 37, so that the key will be hidden in a 12 "haystack" memory matrix of 481 bits.

Also, in this example assume that the secret number ID is 123, and that for simplicity of illustration $i=j=2$:

$$P_1 = g_1(ID) = ID^3 \bmod 13$$

$$P_2 = g_2(ID) = ID^7 \bmod 13$$

$$Q_1 = g_1'(ID) = ID^5 \bmod 37$$

$$Q_2 = g_2'(ID) = ID^7 \bmod 37$$

From these expressions:

| | |
|---|---|
| $P_1$ | = 8 |
| $P_2$ | = 7 |
| $Q_1$ | = 7 |
| $Q_2$ | = 9 |

Further, assume that, as polynomials, the following expressions are chosen:

$$y = [P_1 + P_2 x] \bmod 13$$

$$z = [Q_1 Q_2 y] \bmod 37$$

These expressions enable the development of the following table for the 11 values of y to be calculated:

| x | y | z |
|---|---|---|
| 0 | 8 | 5 |
| 1 | 2 | 29 |
| 2 | 9 | 14 |
| 3 | 3 | 34 |

-continued

| x | y | z |
|---|---|---|
| 4 | 10 | 23 |
| 5 | 4 | 6 |
| 6 | 11 | 32 |
| 7 | 5 | 15 |
| 8 | 12 | 4 |
| 9 | 6 | 24 |
| 10 | 0 | 7 |
| 11 | 7 | 33 |

It is to be noted that each of the values of y is different.

A 13 column by 35 row y,z ROM, corresponding to A=13 and B=37, with 481 cells, is programmed to have the number 1–481 randomly distributed in the memory cells, with each cell having a different number stored therein. For each value of x in the above table, the corresponding values of y and z are employed to locate the column and row of a cell, to recover the number (from 1 to 481) stored therein.

A sample of the pertinent portions of a programmed y,z ROM for this example is as follows:

| x + 1 value or bit position | Haystack memory address |
|---|---|
| 1 | 30 |
| 2 | 401 |
| 3 | 333 |
| 4 | 49 |
| 5 | 111 |
| 6 | 22 |
| 7 | 14 |
| 8 | 96 |
| 9 | 325 |
| 10 | 78 |
| 11 | 83 |
| 12 | 6 |

The haystack memory need not be configured with A columns and B rows, it being necessary only that at least 481 memory bits be present, and that the addresses 1–481 uniquely identify bit locations. For example, the bit positions in each row may be sequentially numbered, with the rows being sequentially considered. The bit positions that are not a part of the code key are randomly programmed to have 0's 1's therein. As in the

|   |   | x | 10 |   | 1 | 3 | 5 | 7 | 9 | 11 | 0 | 2 | 4 | 6 | 8 |
|---|---|---|----|---|---|---|---|---|---|----|---|---|---|---|---|
| y | z | y | 0 | 1 | 2 | 3 | 4 | 5 | 6 | 7 | 8 | 9 | 10 | 11 | 12 |
|   | 0 |   |   |   |   |   |   |   |   |   |   |   |   |   |   |
|   | 1 |   |   |   |   |   |   |   |   |   |   |   |   |   |   |
|   | 2 |   |   |   |   |   |   |   |   |   |   |   |   |   |   |
|   | 3 |   |   |   |   |   |   |   |   |   |   |   |   |   |   |
| 12 | 4 |   |   |   |   |   |   |   |   |   |   |   |   |   | 325 |
| 8 | 5 |   |   |   |   |   |   |   | 30 |   |   |   |   |   |   |
| 4 | 6 |   |   |   |   | 22 |   |   |   |   |   |   |   |   |   |
| 0 | 7 |   | 83 |   |   |   |   |   |   |   |   |   |   |   |   |
|   | 8 |   |   |   |   |   |   |   |   |   |   |   |   |   |   |
|   | 9 |   |   |   |   |   |   |   |   |   |   |   |   |   |   |
|   | 10 |   |   |   |   |   |   |   |   |   |   |   |   |   |   |
|   | 11 |   |   |   |   |   |   |   |   |   |   |   |   |   |   |
|   | 12 |   |   |   |   |   |   |   |   |   |   |   |   |   |   |
|   | 13 |   |   |   |   |   |   |   |   |   |   |   |   |   |   |
| 9 | 14 |   |   |   |   |   |   |   |   |   | 333 |   |   |   |   |
| 5 | 15 |   |   |   |   |   | 96 |   |   |   |   |   |   |   |   |
|   | 16 |   |   |   |   |   |   |   |   |   |   |   |   |   |   |
|   | 17 |   |   |   |   |   |   |   |   |   |   |   |   |   |   |
|   | 18 |   |   |   |   |   |   |   |   |   |   |   |   |   |   |
|   | 19 |   |   |   |   |   |   |   |   |   |   |   |   |   |   |
|   | 20 |   |   |   |   |   |   |   |   |   |   |   |   |   |   |
|   | 21 |   |   |   |   |   |   |   |   |   |   |   |   |   |   |
|   | 22 |   |   |   |   |   |   |   |   |   |   |   |   |   |   |
| 10 | 23 |   |   |   |   |   |   |   |   |   |   | 111 |   |   |   |
| 6 | 24 |   |   |   |   |   |   | 78 |   |   |   |   |   |   |   |
| 2 | 25 |   |   |   | 401 |   |   |   |   |   |   |   |   |   |   |
|   | 26 |   |   |   |   |   |   |   |   |   |   |   |   |   |   |
|   | 27 |   |   |   |   |   |   |   |   |   |   |   |   |   |   |
|   | 28 |   |   |   |   |   |   |   |   |   |   |   |   |   |   |
|   | 29 |   |   |   |   |   |   |   |   |   |   |   |   |   |   |
|   | 30 |   |   |   |   |   |   |   |   |   |   |   |   |   |   |
|   | 31 |   |   |   |   |   |   |   |   |   |   |   |   |   |   |
| 11 | 32 |   |   |   |   |   |   |   |   |   |   |   | 14 |   |   |
| 7 | 33 |   |   |   |   |   |   | 6 |   |   |   |   |   |   |   |
| 3 | 34 |   |   |   | 49 |   |   |   |   |   |   |   |   |   |   |
|   | 35 |   |   |   |   |   |   |   |   |   |   |   |   |   |   |
|   | 36 |   |   |   |   |   |   |   |   |   |   |   |   |   |   |

The numbers in the y,z ROM correspond to memory locations in the haystack ROM, and the x+1 value corresponds to the bit position in the code key at which the corresponding bit of the haystack memory will be found. (Cells not shown are, of course, also randomly programmed with the remaining numbers from 1–481 so that a different ID will select a different set of haystack memory addresses.) Therefore, in the above example:

case of the y,z memory, the haystack memory may comprise a part of larger memory. An example of, with selected key bits 1, 4, 6, 7 and 12 identified, a key portion of a haystack memory that can be used in the above example is as follows:

|    | 0 | 1 | 2 | 3 | 4 | 5 | 6 | 7 | 8 | 9 |
|----|---|---|---|---|---|---|---|---|---|---|
| 0  | 1 | 1 | 0 | 1 | 0 | 1 | 1 | 1 | 0 | 1 |
| 10 | 0 | 1 | 0 | 0 | 0 | 1 | 1 | 0 | 1 | 1 |
| 20 | 0 | 0 | 1 | 1 | 1 | 0 | 1 | 1 | 1 | 0 |

-continued

|     | 0 | 1 | 2 | 3 | 4 | 5 | 6 | 7 | 8 | 9 |
|-----|---|---|---|---|---|---|---|---|---|---|
| 30  | 1 | 1 | 0 | 1 | 0 | 1 | 1 | 1 | 1 | 0 |
| 40  | 1 | 1 | 1 | 1 | 0 | 0 | 1 | 0 | 0 | 1 |
| .   |   |   |   |   |   |   |   |   |   |   |
| .   |   |   |   |   |   |   |   |   |   |   |
| 470 | 0 | 1 | 1 | 0 | 0 | 0 | 1 | 1 | 0 | 1 |
| 480 | 1 | 0 | 1 | 1 | 0 | 0 | 1 | 1 | 1 | 0 |

Figure 3:
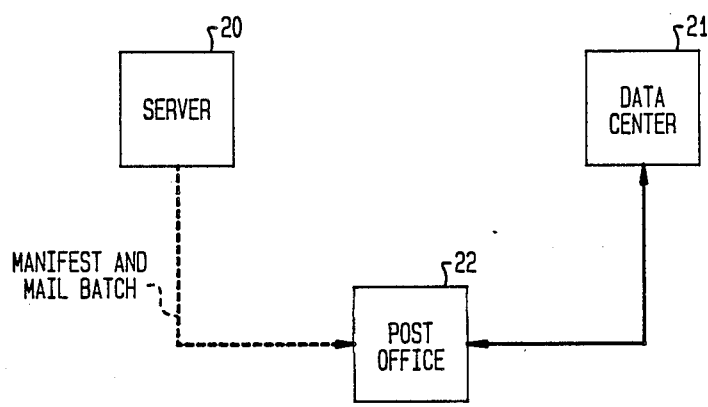
FIG. 3 is a block diagram of a Postal System employing the invention.

As illustrated in FIG. 3, the method and apparatus in accordance with the invention may be incorporated at the server 20 and the data center 21 of a postal system adapted for the mailing of batch mail. The server 20 is adapted to prepare a batch of mail and a manifest to accompany the batch, and to forward this material to a Post Office 22. The manifest includes data such as the totals for different classes of mail in the batch, and amounts of postage required for mailing the mail of the batch. In addition, the manifest includes an identification of the server, the number of the current transaction of the server, and the date. Still further, the manifest includes and encryption number, based, for example, upon DES encryption, employing the above-discussed key is the encryption key, of critical information on the manifest. The identification of the server in this case is not necessarily the ID number employed in the generation of the encryption/decryption key. This ID may be stored in memory at the server or input at the server by authorized personnel.

The Post Office 22 inspects the manifest it has received with the batch, and, for verification thereof, may request verification of the manifest by the data center 21. For this purpose, the Post Office may transmit determined information, such as the transaction number, identification of the server, and date of issue of the manifest, to the data center. The data center has stored therein the ID numbers corresponding to the various servers, as well as the tables and algorithms required to generate the key. Based upon this material, the data center calculates the required key, and upon receipt of the encryption of the manifest from the Post Office, generates the pertinent data that should appear on the manifest. The Post Office receives this additional material from the data center, and, if it conforms with the data actually on the manifest, verifies the manifest.

FIG. 3 illustrates a further flow diagram of the method in accordance with the invention. As illustrated, the ID is input to the system at block 30. In the case of the data center, the information that is input may constitute the inputting of information that identifies the server, but not the ID employed in the calculations. Thus, the data center may be provided with a table or the like or determining the ID from the input information. If necessary, the ID may be verified, at block 31, to determine if it is a valid ID. Upon such verification, the values $y(x)$ and $z(y)$ are calculated at block 32 for $x=0, 1 \ldots N-1$, to produce a table of y,z memory cell addresses for identifying the addresses of the haystack memory, at which the key resides, as indicated at block 33. The bits retrieved from the haystack memory are stored in memory as indicated at lock 34, and are reordered as a function of the parameters x, as illustrated at block 35. The resultant key may then be employed in an encryption/decryption process, as indicated at block 36.

In order to further enhance the security of the system, the microcomputer with its memories may, of course, be potted, with conventional physical precautions taken that render the microchip employed very difficult to read.

While the invention has been disclosed and described with reference to a single example, it will be apparent that many variations and modifications may be made therein, and it is therefore intended in the following claims to cover each such variation and modification as falls within the true spirit and scope of the invention.

What is claimed is:

1. A method for generating a key code from an identification number ID, said key having N bits, comprising
   generating a first plurality of numbers, modulus A and a second plurality of numbers, modulus B, from ID, in accordance with a set of algorithms, wherein A and B are prime numbers with A greater than $N-1$;
   generating N values $y(x)$, mod A, from a first polynomial having said first plurality of numbers as coefficients and x as a variable, wherein x is an integer from 0 to $N-1$;
   generating a value $z(y)$, mod B, from a second polynomial having said third, fourth and fifth numbers as coefficients and y as a variable, corresponding to each value of $y(x)$
   accessing a memory at addresses as determined as function of y,z corresponding to each value of x to retrieve data therein, and reordering said data as a function of the value of x to produce said key.

2. A device for generating a key code from an identification number ID, said key having N bits, comprising:
   means for generating a first plurality of numbers, modulus A and a second plurality of numbers, modulus B, from ID, in accordance with a set of algorithms, wherein A and B are prime numbers, with A greater than $N-1$;
   means for generating N values $y(x)$, mod A, from a first polynomial having said first plurality of numbers as coefficients and x as a variable, wherein x is an integer from 0 to $N-1$;
   means for generating a value $z(y)$, mod B, from a second polynomial having said second plurality of numbers as coefficients and y as a variable, corresponding to each value of $y(x)$, and;
   means for accessing a memory at addresses determined as a function of y,z corresponding to each value of x to retrieve data therein, and reordering said data as a function of the value of x to produce said key.

3. Means for generating corresponding keys at first and second stations from an identification number ID, said key having N bits, comprising:
   means at each of said first and second stations for generating an identical first plurality of numbers, modulus A and an identical second plurality of numbers, modulus B, from ID, in accordance with a set of algorithms, wherein A and B are prime numbers, and A is greater than $N-1$;
   means at each station for generating identical N values $y(x)$, mod A, from a first polynomial having said first plurality of numbers as coefficients and x as a variable, wherein x is an integer from 0 to $N-1$;
   means at each station for generating an identical value $z(y)$, mod B, from a second polynomial having said second plurality of numbers as coefficients and y as a variable, corresponding to each value of $y(x)$; and, means at each station for accessing a memory at addresses determined as a function of y,z corresponding to each value of x to retrieve data therein, and reordering said data as a function of the value of x to produce said key.

4. A method for generating a key code having N elements and corresponding to a number, ID, comprising the steps of:
   (a) generating a unique sequence of N memory addresses as a modular function of said number ID; and,
   (b) accessing memory cells in accordance with said sequence of memory addresses and retrieving code elements stored therein;
   (c) whereby the resulting sequence of code elements constitutes said key code; and wherein,
   (d) the number of said memory cells is substantially greater than N, and cells other than said accessed cells contain randomly selected code elements.

5. The method of claim 4 wherein the number of said cells is M, comprisng the further steps of:
   (a) providing a second memory having M cells;
   (b) randomly storing the addresses of said cells in said first memory in said cells of said second memory; and;
   (c) wherein step (a) further comprises generating a unique sequence of N memory addresses for said cells of said second memory as a function of said number ID and retrieving the corresponding sequence of addresses for said cells of said first memory from said addressed cells of said second memory.

6. The method of claim 5 wherein M=A*B, and A and B are prime numbers, and A is the smallest prime number greater than N−1.

7. The method of claim 6 wherein said step of generating said sequence of addresses or said second memory comprises the further steps of:
   (a) generating a unique series of N column addresses y for A columns of said second memory as a function of said number ID and a variable x, where each value of x corresponds to one element of said key code;
   (b) generating a unique series of N row addresses for B rows of said second memory as a function of said number ID and $y_i$ and
   (c) for each element of said key code selecting said address for said cells in said first memory to be said address stored in the row and column of said second memory defined by said corresponding value of x.

8. The method of claim 6 wherein said number ID is, at least in part, defined by the identity of a user of said key code.

9. The method of claim 6 wherein said number ID is, at least in part, defined by a sequence number identified in a particular use of said key code.

10. The method of claim 4 wherein said number ID is, at least in part, defined by the identity of a user of said key code.

11. The method of claim 4 wherein said number ID is, at least in part, defined by a sequence number identified in a particular use of said key code.

12. Apparatus for generating key code having N elements and corresponding to a number, ID, comprising:
   (a) means for generating a unique sequence of N memory addresses as a modular function of said number ID, and;
   (b) means for accessing memory cells in a memory in accordance wih said sequence of memory addresses and retrieving code elements stored therein;
   (c) whereby the resulting sequence of code elements constitutes said key codes; and wherein,
   (d) the number of said memory cells is substantially greater than N, and cells other than said accessed cells contain randomly selected code elements.

13. The apparatus of claim 12 wherein the number of said cells is M, comprising:
   (a) a second memory having M cells;
   (b) said second memory randomly storing the addresses of said cells in said first memory in cells of said second memory, and;
   (c) wherein said generating means further comprises means for generating a unique sequence of N memory addresses for said cells of said second memory as a function of said number 10 and retrieving the corresponding sequence of addresses for said cells of said first memory from said addresses cells of said second memory.

14. The apparatus of claim 13 wherein M=A*B, and A and B are prime numbers, and A is the smallest prime number greater than N−1.

15. The apparatus of claim 14 wherein said further generating means still further comprises:
   (a) means for generating a unique series of N column address y for A columns of said second memory as a function of said number ID and a variable x, where each value of x corresponds to one element of said key code;
   (b) means for generating a unique series of N row addresses for B rows of said second memory as a function of said number ID and $y_i$ and
   (c) means for each element of said key code, selecting said address for said cells in said first memory to be said address stored in the row and column of said second memory defined by said corresponding value of x.

16. The apparatus of claim 14 wherein said number ID is, at least in part, defined by the identity of a user of said key code.

17. The apparatus of claim 14 wherein said number ID is, at least in part, defined by a sequence number identify in a particlar use of said key code.

18. The apparatus of claim 12 wherein said number ID is, at least in part, defined by the identity of a user of said key code.

19. The apparatus of claim 12 wherein said number ID is, at least in part, defined by a sequence number identify in a particular use of said key code.

* * * * *